Jan. 10, 1956 H. T. M. RICE ET AL 2,730,212
RELEASABLE TORQUE TRANSMITTING APPARATUS
Filed Jan. 8, 1952 3 Sheets-Sheet 2
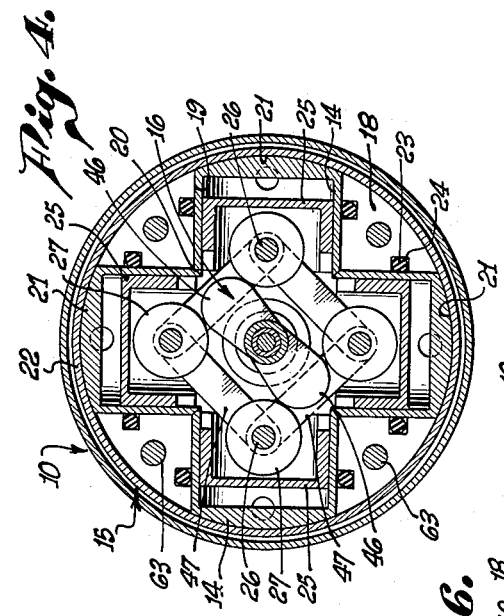
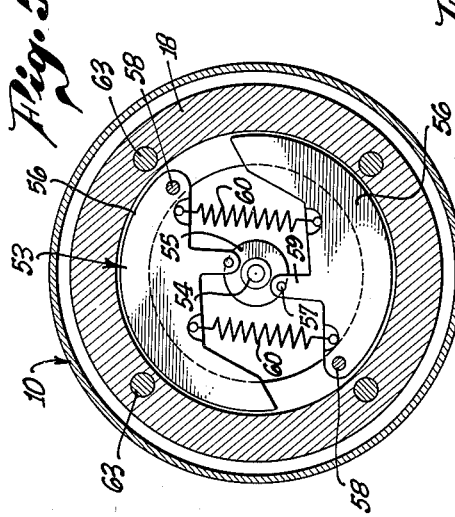
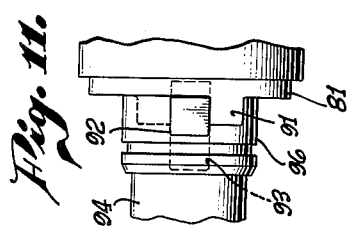
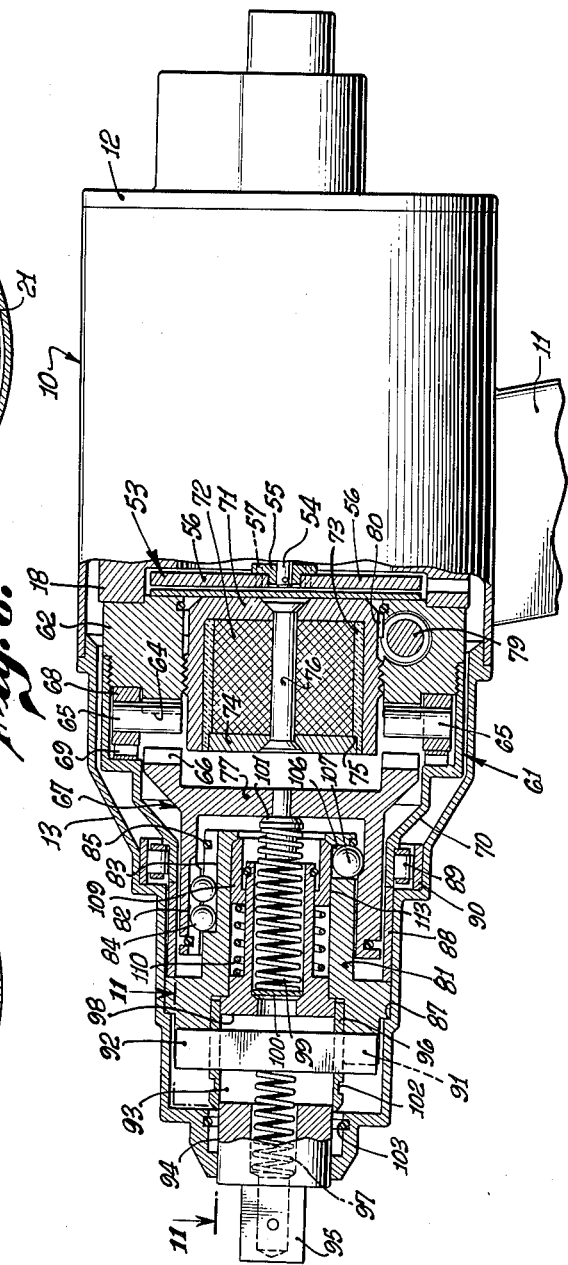
HENRY T. M. RICE,
ROBERT T. STEVENS,
INVENTORS.
BY
*Bernard Kriegel*
ATTORNEY.

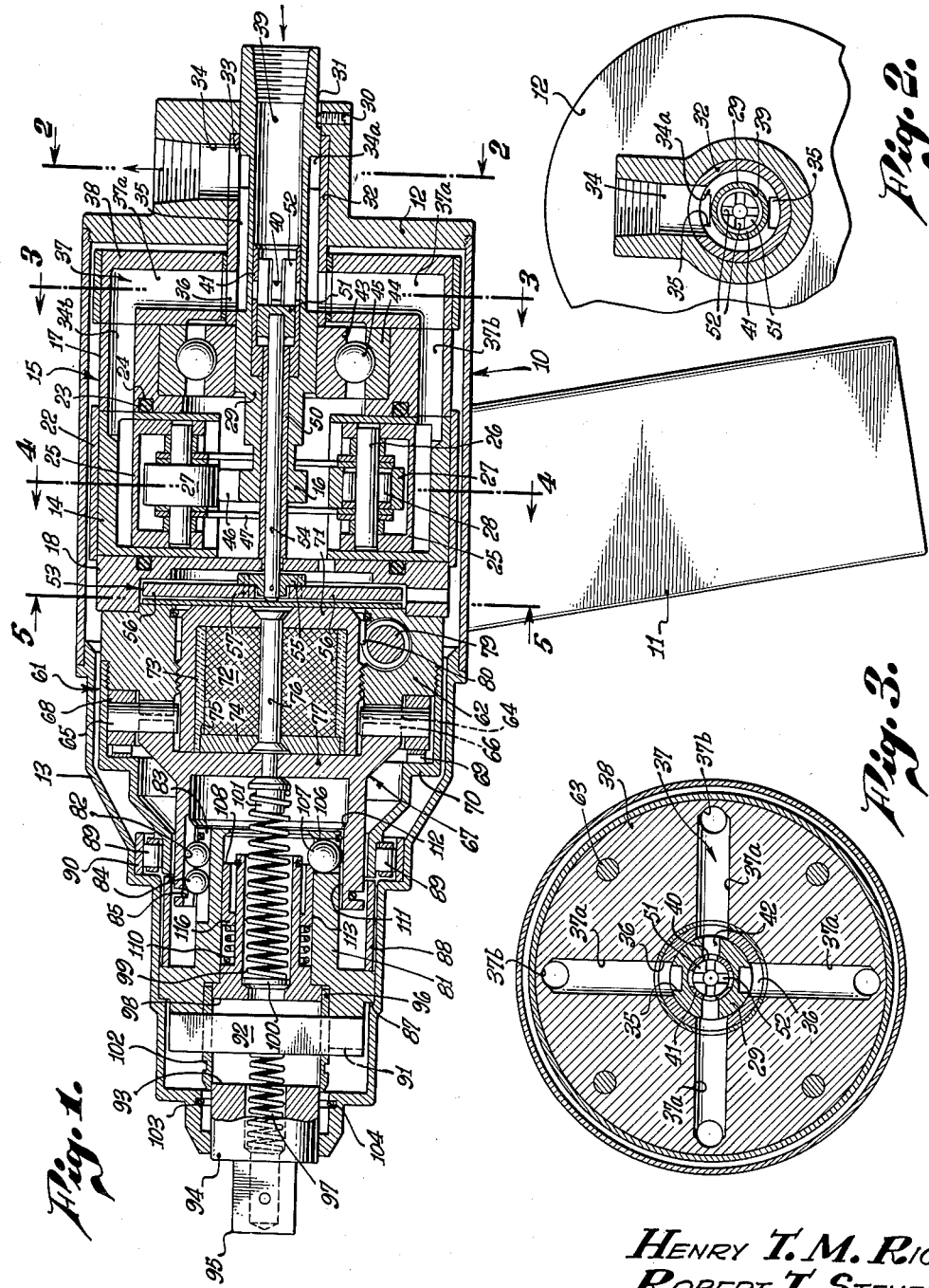

Jan. 10, 1956   H. T. M. RICE ET AL   2,730,212
RELEASABLE TORQUE TRANSMITTING APPARATUS
Filed Jan. 8, 1952   3 Sheets-Sheet 3
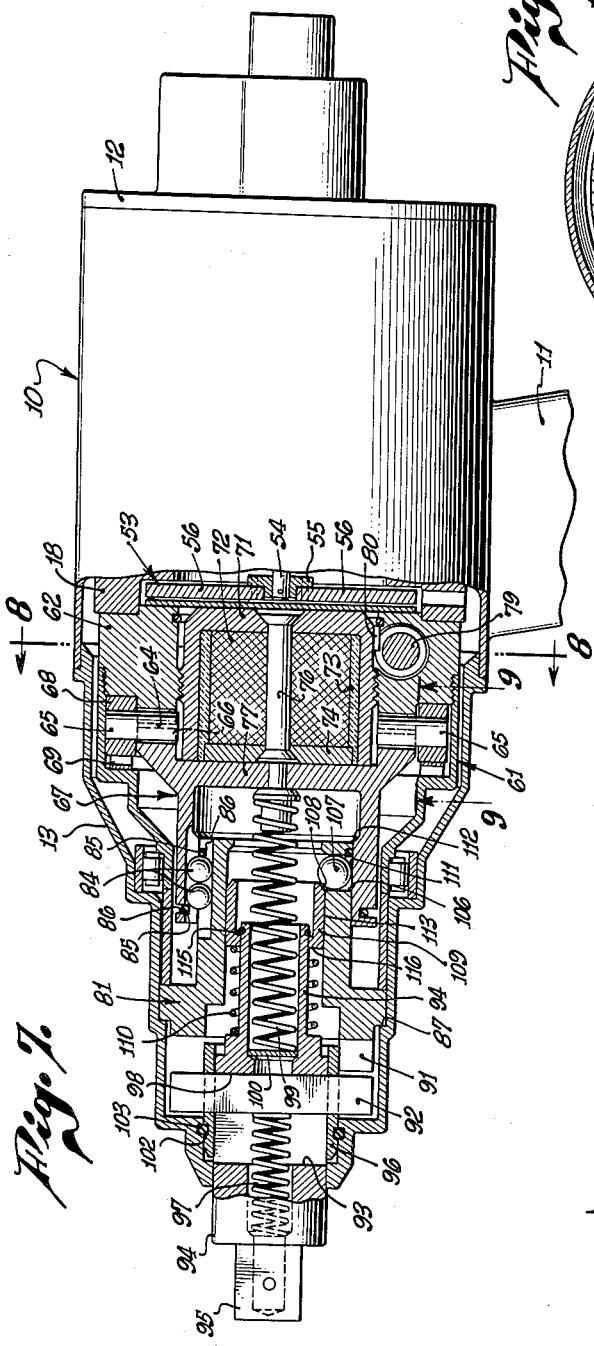
HENRY T. M. RICE,
ROBERT T. STEVENS,
INVENTORS.
BY
Bernard Kriegel
ATTORNEY.

United States Patent Office 2,730,212
Patented Jan. 10, 1956

2,730,212
RELEASABLE TORQUE TRANSMITTING APPARATUS

Henry T. M. Rice, San Marino, and Robert T. Stevens, Altadena, Calif., assignors to Dillon Stevens, Los Angeles, Calif.

Application January 8, 1952, Serial No. 265,511

19 Claims. (Cl. 192—.096)

The present invention relates to torque transmitting apparatus, and more particularly to devices which automatically disconnect the drive when the torque transmitted exceeds a predetermined value.

This application is a continuation-in-part of the application of Dillon Stevens, Henry T. M. Rice and Robert T. Stevens, Serial No. 190,344, filed October 16, 1950, for "Releasable Torque Transmitting Apparatus."

Power operated devices have been used for transmitting torque and for uncoupling or unclutching the drive when the torque exceeds a predetermined value. Devices of that type have been employed for tightening threaded fastening elements, such as screws, nuts, bolts and studs, to a predetermined extent. However, as the threated element is tightened, increased resistance is encountered, resulting in a reaction torque being imparted to the holder of the device, which may be a person, in the event the device is of the hand held type. The necessity to offer resistance to such reactions is obviously productive of strain and fatigue on the person, and may be dangerous when comparatively high torques are involved.

Accordingly, an object of the present invention is to provide releasable torque transmitting apparatus which does not subject the holder of the apparatus to any appreciable reaction torque. In fact, the reaction torque is exceedingly small, and may be non-existent, for all practical purposes.

Another object of the invention is to provide torque transmitting apparatus which releases automatically when a predetermined torque is transmitted, and in which substantially no reaction shocks or loads are imparted to the person holding the apparatus during its operation.

A further object of the invention is to provide torque transmitting apparatus which releases automatically when a predetermined torque is transmitted, and in which greater energy than corresponds to the predetermined torque is stored in inertia portions of the apparatus prior to interruption of the drive, which energy is transmitted through the apparatus in such manner as to prevent reaction torques from being imparted to the holder of the apparatus.

Yet another object of the invention is to provide an improved spline connection between members of a releasable torque transmitting apparatus which are rotatable together and longitudinally movable with respect to each other.

A further object of the invention is to provide an improved clutch mechanism which is normally urged to disengaged position, and which embodies improved latch means for securing it in disengaged position.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is a longitudinal section through an apparatus embodying the invention, with parts being shown in elevation;

Fig. 2 is a cross-section taken along the line 2—2 on Fig. 1;

Fig. 3 is a cross-section taken along the line 3—3 on Fig. 1;

Fig. 4 is a cross-section taken along the line 4—4 on Fig. 1;

Fig. 5 is a cross-section taken along the line 5—5 on Fig. 1;

Fig. 6 is a view similar to Fig. 1, disclosing the primary clutch of the appartus in disengaged position;

Fig. 7 is a view similar to Fig. 1, illustrating the secondary clutch of the apparatus in disengaged position, and the primary clutch reengaged;

Fig. 8 is a cross-section taken along the line 8—8 on Fig. 7;

Fig. 9 is a somewhat diagrammatic fragmentary section taken along the line 9—9 on Fig. 7;

Fig. 10 is a view similar to Fig. 9, disclosing the primary clutch elements disengaged;

Fig. 11 is a side elevation of the secondary clutch portion of the apparatus.

The apparatus embodying the invention is illustrated in the drawings in the form of a releasable torque transmitting device, particularly designed for rotating threaded fastening elements (not shown), such as nuts, bolts and screws, to a predetermined degree of tightness. It is to be understood, however, that the invention has other uses, in that it is of more general application than the one specifically mentioned.

As illustrated in the drawings, a fluid operated motor is contained within a housing or casing 10 that may be manually held, as by suitably grasping a handle 11 extending laterally from the housing. The rear end of the housing 10 has an end closure 12 threaded thereinto, whereas, the forward end of the housing is suitably secured to a housing or case 13 for the releasable torque transmitting portion of the apparatus.

Disposed within the motor housing 10 are radially arranged cylinders 14, which, as specifically illustrated, are carried in a rotor or head 15 that is rotatable about the axis of the housing 10 and of a stationary cam 16. The head includes two parts 17, 18 which abut one another in the central transverse plane of the cylinders 14. The two parts have radial semi-cylindrical bores 19 therein which collectively provide pockets or recesses for receiving the radial cylinders 14, all of which preferably lie in the same transverse plane perpendicular to the axis of the cam 16. The inner ends 20 of the cylinders mutually abut, while their outer head ends 21 are curved, to coincide with the periphery of the rotatable head 15. The cylinders 14 are maintained in proper assembled relation in the head 15, with their inner ends 20 in abutment with one another by an encompassing retaining band or sleeve 22 which engages the outer peripheries of the cylinders 14 and also the outer peripheries of the two head portions 17, 18 on opposite sides of the cylinders. It is apparent that the band 22 prevents outward movement of the cylinders 14 from the head, while maintaining the head portions in alignment. Fluid leakage between the exterior of each cylinder 14 and the head 15 is prevented by a suitable side seal 23, such as a rubber, or rubber-like, O ring, encompassing the cylinder and contained within a suitable ring groove 24 formed in the two head sections 17, 18.

A piston 25 is reciprocable in each of the cylinders 14, being capable of moving radially inward or outward of the cylinder. Each piston has a wrist pin 26 extending thereacross, on which a follower roller 27 is rotatably mounted through the agency of anti-friction roller bearing elements 28, which are rollable upon the wrist pin 26 and also upon the inner surface of the follower roller 27. The latter member is engageable with the periphery of the eccentric member or cam 16, which, in the device illustrated in the drawings, is held stationary. Thus, the cam has a sleeve extension 29 extending rearwardly from the plane of the cylinders 14 out through the end closure 12, to which the extension may be secured in any suitable manner, as by means of a set screw 30 threaded transversely in the extension 12 and bearing upon a flat portion 31 of the cam sleeve extension.

The extension 29 is appropriately supported in the end closure 12, having a rather long bearing surface in contact with the end closure itself, or with a sleeve 32 surrounding the extension 29 and carried within the closure 12. This sleeve is designed to determine the passage of air, or corresponding fluid medium, from the cylinders. Thus, the sleeve 32 is provided with an exhaust side port 33 communicating with an outlet 34 extending transversely through the end closure 12. This exhaust port 33 communicates with an exhaust groove 34a in the cam extension member 29, which, in turn, communicates with a pair of diametrically opposite exhaust passages 35 formed in the extension, each of which leads to an exhaust port 36 in the sleeve 32 forwardly of the rear end closure 32. These diametrically opposite ports 36 are arranged to communicate with fluid passages 37 in another section 38 of the head or rotor 15 leading through the section 17 to the head end of each cylinder 14. There is one of these passages 37 for each of the cylinders, the passage including a transverse branch 37a extending through the section 38 of the rotatable head or rotor, which communicates with a longitudinally extending portion 37b running through the intermediate head portion 17 and leading into the head end of the cylinder.

The cam extension 29 also has a central inlet passage 39 for air, or other fluid, which communicates with lateral ports 40 in a bearing sleeve 41 in alignment with diametrically opposed inlet ports 42 extending through the cam extension 29 and sleeve 32 surrounding the latter (see Fig. 3, particularly). These inlet ports 42 are disposed 90 degrees out of phase with the exhaust ports 36 extending through the sleeve 32. Thus, a pair of diametrically opposite transverse passages 37a through the rotor 15 will be in alignment with the inlet ports 42, while another pair of transverse passages are in alignment with the exhaust ports 36. Accordingly, air under pressure can enter one pair of diametrically opposite cylinders 14 to urge their pistons 25 inwardly while the diametrically opposite pistons of the other pair of cylinders are moving outwardly to exhaust the air to the atmosphere.

The rotor 15 is rotatably supported by the cam extension 29 through the aid of a ball bearing, which consists of an inner race 43 mounted on the cam extension, and an outer race 44 clamped between the intermediate head portion 17 and the end head portion 38. A set of balls 45, or corresponding rolling elements, are rollable in both races.

As disclosed in the drawings, the follower rollers 27 on the pistons 25 engage the periphery of the radial cam 16, which has two diametrically opposite and radially extending lobes 46. The cam is so designed that one pair of diametrically opposite pistons 25 is being moved radially outward while another pair is moving radially inward, the follower rollers 27 being at all times maintained in engagement with the periphery of the cam. To insure such engagement, the pistons are preferably interconnected by links 47. Thus, a pair of links is pivotally mounted on a wrist pin 26 of one piston on opposite sides of its follower roller 27, and this pair of links has its two other ends pivotally mounted on a wrist pin of a piston disposed 90 degrees away. Another pair of links 47 is pivotally mounted on a wrist pin 26 of the first-mentioned piston on opposite sides of its follower roller 27, and this pair of links extends in the oposite direction from the first pair, and is pivotally mounted on a wrist pin 26 of a piston which is diametrically opposite the second-mentioned piston. These second and third pistons are, in turn, connected to the fourth piston by means of links 47 in the same manner that the first piston is connected to the second and third pistons.

It is aparent that as a pair of diametrically opposite pistons 25 is moving inwardly, with their follower rollers 27 in engagement with the cam 16, that the links 47 cause the other pair of pistons 25 to move radially outward. Similarly, when the second pair of pistons is moving inwardly, the links cause the first pair to move outwardly. In addition, assurance is had that the pistons 25 of each diametrically opposite pair are moving toward each other, or away from each other, at the same time, and that they are always disposed the same distance from the axis of the cam 16.

In the operation of the air motor, compressed air enters the air inlet 39 of the cam extension 29 and will pass through the inlet ports 42 into one pair of diametrically opposite rotor passages 37, the air passing into the head end of one pair of diametrically opposite cylinders 14. This air will force the pistons 25 radially inward and, because of the slope of the faces of the stationary cam 16, the pistons 25 will be caused to be moved angularly, or to rotate, about the axis of the cam, carrying the cylinders 14 and head 15 around with them, as well as the other pair of cylinders and pistons, the follower rollers 27 of which are caused to ride up the cam faces to force their pistons radially outward, exhausting the air in their cylinders through the other pair of passages 37 and through the exhaust ports and passages 36, 35, 34a, 33, 34 to the atmosphere.

As was just stated, the inward action of one pair of pistons 25 causes all of the pistons and cylinders 14, and the head 15, to rotate about the axis of the cam 16, until the pair of air actuated pistons are in their innermost position, as determined by engagement of their follower rollers 27 with the low points of the cam 16, at which time the follower rollers 27 of the other pair of pistons are at the high points of the cam (Fig. 5). At this time, the head 15 has rotated to a position in which the passages 37 for the first pair of cylinders are now in communication with the exhaust ports 36, whereas the passages for the other pair of cylinders have been rotated into communication with the inlet ports 42. Air under pressure will now enter the last-mentioned passages, moving the diametrically opposite pistons 25 inwardly and in a downward direction along the cam faces, the other pair of pistons being caused to move radially outward in their cylinders 14 by riding up the cam surfaces, the air from these cylinders passing out through the exhaust ports 36 to the atmosphere.

The above described mode of operation occurs alternately with the diametrically opposite pairs of cylinders and pistons, each cylinder being first exposed to air under pressure from the inlet 39 and then, when its piston is at the innermost portion of its stroke, being placed in communication with the exhaust port 36. In this manner, air under pressure is being applied to a pair of diametrically opposite cylinders at all times, to insure the continued rotation of the cylinders 14, pistons 25 and their supporting head or rotor 15.

The speed of the motor is maintained constant by a speed controlled valve device which determines the amount of air that can pass through the inlet ports 42. This valve includes the sleeve 41 described above, which is secured to a sleeve extension 50 running through the stationary cam 16 and suitably secured to the head 15; so as to rotate therewith. The sleeve 41 has four ports 40, one in alignment with each of the rotor passages 37a, whereas there are only two diametrically opposite ports 42 extending through the cam extension 29 and outer sleeve 32.

An inner sleeve 51 is disposed within the intermediate sleeve 41, and this inner sleeve is provided with four slots 52. The inner sleeve 51 is rotatable with the intermediate sleeve 41, but is angularly movable with respect thereto; so as to be disposed varying amounts across the intermediate sleeve ports 40, and thereby determine the pressure of the air that can enter these ports 40 and the rotor passages 37 leading to the cylinders 14. The sleeve valve 51 is angularly movable within the intermediate sleeve 41 between positions in which the ports 40 of the latter are fully open and fully closed.

The inner sleeve 51 is angularly movable within the intermediate sleeve 41 by a speed responsive governor 53. Thus, the inner sleeve 51 is secured to a rod 54 extending freely through the intermediate sleeve extension 50. The forward end of this rod is attached to a disc 55, to which diametrically opposite governor weights 56 are connected by means of pins 57. Each weight is pivoted on the forward head portion 18 by a fulcrum pin 58, and has a transversely extending arm 59 connected to the disc 55 by means of the aforementioned pin 57. The weights 56 are oppositely directed and tend to move outwardly under the influence of centrifugal force, in order to angularly move the disc 55 in a direction urging the inner valve 51 to closed position across the intermediate sleeve ports 40. Such outward swinging of the weights 56 about their fulcrum pins 58 is resisted by helical tension springs 60, one end of each of which is attached to a weight 56 at a point remote from its fulcrum pin 58, and the other end of which is secured to the opposite weight at any suitable point, such as a point adjacent its fulcrum pin. It is apparent that upon deceleration of the rotor or head 15, the springs 60 will urge the weights 56 inwardly to rotate the disc 55, valve rod 54 and inner valve sleeve 51 in a direction opening the intermediate sleeve ports 40 to allow a greater quantity of air under greater pressure to enter the rotor passages 37.

The forward head portion 18 abuts the end of the rotatable housing 61 of the automatic releasable torque transmitting mechanism and is directly connected thereto, providing a one-to-one driving ratio between the fluid motor and the torque transmitting mechanism. The housing 61 includes a primary driving clutch member 62 directly connected to the rotor 15, so that the parts rotate as a unit. As specifically disclosed, the sections of the rotor 15 and the driving clutch member 62 are attached together by circumferentially spaced longitudinally extending studs 63 projecting through all of the rotor sections 38, 17, 18 and threaded into the driving clutch member 62.

The driving member 62 of the primary clutch has cam type of axial clutch teeth 64 on its forward portion engageable with rollers 65, which, in turn, are engageable with cam type of axially extending clutch teeth 66 on a driven member 67 of the primary clutch (Figs. 9 and 10). The transversely extending clutch rollers 65 are rotatably mounted in a ring or cage 68, which is urged in a rearward direction against the driving clutch member 62 by a spring device 69, which may assume the form of a spring washer of wave-shape engaging the cage 68 and bearing upon the forward rotatable housing portion 70, which is threaded onto the driving clutch member 62. The spring washer 69 can yield to allow the cage 68 to move axially forwardly when the primary clutch is to be released.

The primary clutch elements 62—67 are maintained in driving engagement with one another by magnetic means. Thus, a cup-shaped magnet holder 71 is threaded in the driving clutch member 62 and carries a permanent magnet 72 therein. A suitable non-magnetic shield 73, such as a brass bushing, is interposed between the magnet 72 and the side wall of the holder 62. A plate 74 extends across the forward face of the permanent magnet 72, engaging a shoulder 75 in the bushing to hold the latter in place. The cup-shaped holder 71, bushing 73, magnet 72, and plate or pole piece 74 are secured together by a central rivet 76.

The primary driven clutch member 67 has a transversely extending wall or armature portion 77 which contacts the pole piece 74, to be attracted by the magnet 72 and hold the driven clutch teeth 66 in engagement with the rollers 65 and the rollers in engagement with the driving clutch teeth 64. Since the clutch teeth are formed as cams having inclined faces 78, torque being transmitted therebetween provides an axial force component tending to shift the rollers 65 and the driven clutch member 67 in an axial direction out of driving relation with respect to the rollers 65, to disconnect the primary clutch. When the torque transmitted exceeds the axial force or pull of the magnet 72, the driven member 67 is shifted axially in a forward direction, disengaging the primary clutch.

The torque at which the primary clutch will disengage can be varied by suitably adjusting the position of the magnet 72 in the driving clutch member 62, which determines the points of engagement of the clutch rollers 65 with the driven clutch teeth 66. To effect this adjustment, a worm 79 is rotatably mounted in the driving member 62, meshing with the worm wheel teeth 80 formed on the magnet cup 71. Rotation of the worm 79 in either selected direction will rotate the cup 71 and thread it either forwardly or rearwardly of the driving member 62, to correspondingly shift the driven member 67 away from or towards the driving member. The driven clutch teeth 66 are shaped to require different torques transmitted therethrough to overcome the holding force of the magnet 72 as the rollers 65 engage the driven teeth at different points along their tapered faces 78.

The feature of adjusting the torque at which the clutch will release is both described and claimed in our application for "Adjustable Releasable Torque Transmitting Apparatus," Serial No. 265,513, filed January 8, 1952.

The driven clutch member 67 is connected to the driving member 81 of a secondary clutch through a spline connection. This spline connection includes opposed longitudinal grooves 82, 83 in the driven member 67 and the driving member 81 of the secondary clutch, with one or more balls 84 disposed in the grooves and serving as rollable keys to connect the driven member and driving member together, while permitting the driven member 67 to move axially with respect to the driving member 81. The balls 84 are retained in position within the grooves 82, 83 by split snap rings 85 disposed in peripheral grooves 86 in the driven member 67 and also in the driving member 81 of the secondary clutch.

The driving member 81 of the secondary clutch engages a shoulder 87 in the torque release casing 13, being held against this shoulder by a spacer sleeve 88 which engages the forward end of the rotatable primary clutch housing 70. This housing is rotatably mounted in the torque release case 13 by a suitable bearing, which is disclosed in the form of roller bearing elements 89 engaging the periphery of the housing and also the inner surface of a race 90 confined within the outer case 13.

The secondary driving member 81 has axially extending driving clutch teeth 91 engageable with a transverse pin 92, preferably rectangular or square in cross-section, extending slidably through a transverse slot 93 provided in a spindle or driven member 94 of the secondary clutch, which projects outwardly of the case 13, and provided with a square, or other suitably shaped, end 95, on which a suitable socket wrench or screw driver head (both not shown) may be mounted, for application to a threaded fastening element (not shown). The clutch pin 92 projects in opposite directions through a guide and latch sleeve 96, which is slidable on the spindle 95, this guide and latch sleeve preventing tilting or rocking of the pin 92 in the spindle 94.

The guide and latch sleeve 96 and the driven clutch pin 92 normally are urged in a rearward direction, to hold the pin in engagement with the secondary clutch driving teeth 91, by a helical engaging spring 97 disposed in the spindle and bearing upon the pin. When the spindle 94 is urged rearwardly of the mechanism, the rearward force is transmitted through the spring 97 to the pin 92, urging the latter towards engagement with the primary clutch teeth 91 and tending to maintain such engagement. When the pin 92 is fully engaged with the clutch teeth 91, the rearward end 98 of the spindle slot is spaced away from the pin, to prevent the spindle 94 from interfering with such full engagement under the influence of the spring 97.

The spindle 94 is urged in the opposite direction, to disconnect the pin 92 from the secondary clutch teeth 91, by a disengaging spring 99 disposed within the spindle and bearing upon a suitable spring seat 100 in the latter, and also against a rear spring seat 101 bearing upon the armature 77 of the primary clutch device. This spring 99 urges the spindle 94 in a forward direction, causing the rearward end 98 of the spindle slot to engage the pin 92 and carry it, together with the guide sleeve 96, in a forward direction, until the pin 92 is out of engagement with the secondary clutch driving teeth 91. When this occurs, a groove 102 in the guide sleeve 96 is disposed opposite a detent 103, in the form of a contractible split ring of round cross-section, disposed in a groove 104 in the case 13, this detent snapping partially into the sleeve groove 102 and holding the sleeve 96, together with the clutch pin 92 passing therethrough, in a clutch releasing position.

When the driven member 67 of the primary clutch is urged in a forward direction upon a predetermined torque being transmitted therethrough, which is sufficient to overcome the holding force of the magnet 72, it is held in this holding position by a latch device. Thus, the driving member 81 of the secondary clutch has transverse holes 106 therein in which ball detents 107 are mounted. These balls are urged in an outward direction by the upper cam or tapered portion 108 of a latch sleeve 109 surrounding the spindle 94, the latch sleeve being urged in a rearward direction by a helical spring 110 bearing upon the spindle and the latch sleeve. When the primary clutch is engaged, the ball detents 107 engage the inner cylindrical surface 111 of the primary driven member 67 and cannot be shifted in an outward direction by the latch sleeve 109 (Fig. 1). However, upon forward movement of the driven member 67, as a result of a predetermined torque being transmitted therethrough, a tapered shoulder 112 on the driven member is disposed opposite the latch balls 107, which then allow the sleeve 109 to be shifted rearwardly by its actuating spring 110, forcing the balls laterally outward of the secondary driving member and upon the shoulder 112. At the same time, the cylindrical periphery 113 of the sleeve is disposed across the balls, preventing them from being shifted inwardly by the tapered shoulder 112 on the driven member 67 (Fig. 6). In this manner, the balls 107 hold the primary driven member 67 in its clutch disengaged position, until the ball detents are purposely released.

So long as endwise rearward pressure is being exerted on the spindle 94, the driven member 67 of the primary clutch is held in its released position. Upon removing the endwise pressure on the spindle, the spring 99 shifts the latter forwardly to a position in which the guide sleeve 96 and pin 92 are held in the forward position by the detent 103 entering the sleeve groove 102, holding the pin 92 out of engagement with the teeth 91 of the secondary clutch driving member 81. During such forward motion of the spindle 94 under the influence of the spring 99, a split snap ring 115, or other outward projection, on the spindle 94 engages a shoulder 116 on the latch sleeve 109, to carry the latter in a forward direction to a position in which its cylindrical periphery 113 is disposed out of alignment with the latch balls 107. When this occurs, the spring 99 within the spindle can shift the armature 77 and the primary driven clutch member 67 in a rearward direction, reengaging the armature with the magnet 72, 74, the tapered driven member shoulder 112 forcing the balls 107 inwardly to their retracted retracted position, the primary clutch elements 64, 65, 66 reengaging (Fig. 7). However, any rotation that is now imparted to the driven clutch member 67 and through the spline connection 82–84 to the secondary driving member 81 cannot be transmitted to the spindle 94, since the secondary clutch is latched in disengaged position, as shown in Fig. 7. Endwise pressure in a rearward direction imposed upon the spindle 94 will force the sleeve 96 out of the detent 103 and will allow the spring 97 to shift the pin 92 and sleeve 96 rearwardly to a position in which the pin is again engaged with the driving teeth 91 of the secondary clutch.

In the apparatus described above, it is to be noted that there is a direct drive or connection between the prime mover and the driving member 62 of the releasable torque transmitting apparatus; such direct drive, at a one-to-one ratio, being obtained by securing the fluid motor directly to the driving member of the primary clutch. It is also to be noted that a comparatively large portion of the motor rotates about its axis, such portions including the rotor 15, cylinders 14 and pistons 25. This rotating mass, as well as the mass of the driving clutch member 62, 70 and the magnetic device 71–76 connected thereto, is comparatively large and is disposed radially from the axis of rotation by a substantial extent. Accordingly, a great amount of inertia can be stored in the prime mover and the driving portions of the primary clutch, when the parts are rotating at their desired speed, which is controlled by the governor 53. The amount of energy so stored up in the prime mover mechanism is greater than that required to provide the maximum torque at which the primary clutch 62–77 can be set to release.

In view of the foregoing circumstances, when the spindle 94 is being rotated, as, for example, to tighten a threaded fastening element (not shown), the torque requirements are progressively increased until the primary clutch 62–77 automatically disengages when the desired degree of tightness is secured. However, during such tightening, there is no reaction torque imposed on the housing 10, 13 of the apparatus and imparted to the person holding the apparatus, since there is ample kinetic energy in the rotating prime mover mechanism and torque transmitting parts connected thereto to turn the spindle 94 to the desired extent to tighten the threaded fastening element. As a matter of fact, as noted above, this amount of kinetic energy is greater than that corresponding to the torque at which the primary clutch disengages. Not only is the kinetic energy greater than corresponds to the torque at which the primary clutch will disengage, but the prime mover is connected at a one-to-one ratio, and by direct drive (without any intervening gearing, and the like) to the driving clutch member 62, which provides no moment or lever arms acting upon the outer casing 10, 13 which would tend to provide a reaction torque, or back turning, upon the casing, which must be resisted by the person holding the apparatus. In view of the foregoing circumstances, the person holding the apparatus does not feel any jars or jolts, and need not brace himself to take the reaction loads. He need do nothing more than hold the device, and place it upon and remove it from the threaded fastening elements.

The inventors claim:

1. In torque transmitting apparatus: driving and driven members; coengaging elements on said members effecting a rotatable driving connection between said members, said elements being responsive to the torque transmitted through said members and tending to be disengaged from each other by such torque; means exerting a holding force on said elements to maintain them in engagement with each other until a predetermined torque is transmitted between said elements; a prime mover connected directly to said driving member to couple said prime mover at a one-to-one transmission ratio to said driving member, said prime mover and driving member including rotatable inertia means having greater energy stored therein than corresponds to the predetermined torque at which said elements are releasable from each other.

2. In torque transmitting apparatus: driving and driven members; coengaging clutch elements on said members effecting a rotatable driving connection between said members, said elements comprising cam means responsive to the torque transmitted through said members to disengage said elements from each other; means exerting a holding force on said elements to maintain them in engagement with each other until a predetermined torque is transmitted between said elements; a prime mover connected directly to said driving member to couple said prime mover at a one-to-one transmission ratio to said driving member, said prime mover and driving member including rotatable inertia means having greater energy stored therein than corresponds to the predetermined torque at which said clutch elements are releasable from each other.

3. In torque transmitting apparatus: driving and driven members; coengaging clutch elements on said members effecting a rotatable driving connection between said members, said elements comprising cam means responsive to the torque transmitted through said members to disengage said elements from each other; means exerting a holding force on said elements to maintain them in engagement with each other until a predetermined torque is transmitted between said elements; a motor having a rotatable portion connected directly to said driving member to couple said motor at a one-to-one transmission ratio to said driving member, said rotatable portion and driving member having greater energy stored therein when rotating at normal speed than corresponds to the predetermined torque at which said clutch elements are releasable from each other.

4. In torque transmitting apparatus: driving and driven members; coengaging clutch elements on said members effecting a rotatable driving connection between said members, said elements comprising cam means responsive to the torque transmitted through said members to disengage said elements from each other; means exerting an axially directed force on said clutch elements to hold them in engagement with each other until a predetermined torque is transmitted between said clutch elements; a motor having a rotatable portion coaxially of said driving and driven members and connected directly to said driving member to couple said motor at a one-to-one transmission ratio to said driving member, said rotatable portion and driving member having greater energy stored therein when rotating at normal speed than corresponds to the predetermined torque at which said clutch elements are releasable from each other.

5. In torque transmitting apparatus: driving and driven members; coengaging elements on said members effecting a rotatable driving connection between said members, said elements being responsive to the torque transmitted through said members and tending to be disengaged from each other by such torque; means exerting a holding force on said elements to maintain them in engagement with each other until a predetermined torque is transmitted between said elements; a prime mover comprising a stationary inner portion and a rotatable outer rotor portion connected directly to said driving member to couple said rotor portion at one-to-one transmission ratio to said driving member, said rotor portion and driving member having greater energy stored therein when rotating at normal speed than corresponds to the predetermined torque at which said elements are releasable from each other.

6. In torque transmitting apparatus: driving and driven members; coengaging clutch elements on said members effecting a rotatable driving connection between said members, said elements comprising cam means responsive to the torque transmitted through said members to disengage said elements from each other; means exerting an axially directed force on said clutch elements to hold them in engagement with each other until a predetermined torque is transmitted between said clutch elements; a motor having a stationary inner portion and a rotatable outer rotor portion coaxial of and connected directly to said driving member to couple said rotor portion at a one-to-one transmission ratio to said driving member, said rotor portion and driving member having greater energy stored therein when rotating at normal speed than corresponds to the predetermined torque at which said clutch elements are releasable from each other.

7. In torque transmitting apparatus: driving and driven members; coengaging elements on said members effecting a rotatable driving connection between said members, said elements being responsive to the torque transmitted through said members and tending to be disengaged from each other by such torque; means exerting a holding force on said elements to maintain them in engagement with each other until a predetermined torque is transmitted between said elements; a fluid motor comprising a stationary cam, a rotor disposed about said stationary cam, radially arranged cylinders in said rotor, pistons in said cylinders engageable with said cam; said rotor being connected directly to said driving member to couple said rotor at a one-to-one transmission ratio to said driving member, said rotor, cylinders, pistons, and driving member having greater energy stored therein when rotating at normal speed than corresponds to the predetermined torque at which said elements are releasable from each other.

8. In torque transmitting apparatus: a driving member; a first driven member; coengaging elements on said members effecting a rotatable driving connection between said members, said elements being responsive to the torque transmitted through said members and tending to shift said driven member axially of said driving member to disengage said elements from each other by such torque; means exerting a holding force on said driven member to maintain said elements engaged; a second driven member; means providing a slidable spline connection between said first and second driven members comprising opposed longitudinally extending grooves in said driven members, and rollable elements in said grooves.

9. In torque transmitting apparatus: a driving member; a first driven member; coengaging elements on said members effecting a rotatable driving connection between said members, said elements being responsive to the torque transmitted through said members and tending to shift said driven member axially of said driving member to disengage said elements from each other by such torque; means exerting a holding force on said driven member to maintain said elements engaged; a second driven member; means providing a slidable spline connection between said first and second driven members comprising opposed longitudinally extending grooves in said driven members, and balls in said grooves.

10. In torque transmitting apparatus: a driving member; a first driven member; coengaging elements on said members effecting a rotatable driving connection between said members, said elements being responsive to the torque transmitted through said members and tending to shift said driven member axially of said driving member to disengage said elements from each other by such torque; means exerting a holding force on said driven member to maintain said elements engaged; a second driven member; means providing a slidable spline connection between said first and second driven members comprising opposed longitudinally extending grooves in said driven members, and rollable elements in said grooves; and means on said driven members for retaining said rollable elements in said grooves.

11. In torque transmitting apparatus: a driving member; a first driven member; coengageable elements on said members effecting a rotatable driving connection between said members and responsive to the torque being transmitted to release said elements from each other and axially shift said driven member; means providing a slidable spline connection rotatable with said driven member; a second driven member having a transverse slot therein and movable axially with respect to said means; said means having axially extending clutch teeth; a pin slidable in said slot and engageable with said teeth; and means between said pin and second driven member yieldably urging said pin into engagement with said teeth.

12. In torque transmitting apparatus: a driving member; a first driven member; coengageable elements on said members effecting a rotatable driving connection between said members and responsive to the torque being transmitted to release said elements from each other and axially shift said driven member; means providing a slidable spline connection rotatable with said driven member; a second driven member having a transverse slot therein and movable axially with respect to said means; said means having axially extending clutch teeth; a pin slidable in said slot and engageable with said teeth; means between said pin and second driven member yieldably urging said pin into engagement with said teeth; and means yieldably urging said second driven member in a direction disengaging said pin from said teeth.

13. In torque transmitting apparatus: a driving member; a first driven member; coengageable elements on said members effecting a rotatable driving connection between said members and responsive to the torque being transmitted to release said elements from each other and axially shift said driven member; means providing a slidable spline connection rotatable with said driven member; a second driven member having a transverse slot therein and movable axially with respect to said means; said means having axially extending clutch teeth; a pin slidable in said slot and engageable with said teeth; means between said pin and second driven member yieldably urging said pin into engagement with said teeth; a sleeve surrounding said second driven member and coupled to said pin; and detent means engageable with said sleeve to hold said pin out of engagement with said teeth.

14. In a clutch: a first member having axially extending teeth thereon; a second member having a transverse slot therein; a sleeve slidable on said second member; a transverse pin extending through said sleeve and slot and engageable with said teeth; yieldable means engaging said second member and pin to urge said pin toward said first member; and detent means engageable with said sleeve to hold said pin out of engagement with said teeth.

15. In a clutch: a first member having axially extending teeth thereon; a second member having a transverse slot therein; a sleeve slidable on said second member; a transverse pin extending through said slot and coupled to said sleeve; said pin being slidable in said slot and engageable with said teeth; and spring means between said second member and pin yieldably urging said pin toward meshing engagement with said teeth.

16. In a clutch: a first member having axially extending teeth thereon; a second member having a transverse slot therein; a sleeve slidable on said second member; a transverse pin extending through said slot and coupled to said sleeve; said pin being slidable in said slot and engageable with said teeth; spring means between said second member and pin yieldably urging said pin toward meshing engagement with said teeth; said sleeve having a groove therein; and detent means receivable in said groove to hold said pin out of engagement with said teeth.

17. In a clutch: a first member having axially extending teeth thereon projecting axially outward of said member; a second member having a transverse slot therein; a sleeve slidable on said second member; a transverse pin extending through said sleeve and slot, said pin having portions projecting transversely beyond said sleeve to be engageable with said teeth; yieldable means engaging said second member and pin to urge said pin toward said first member; and detent means engageable with said sleeve to hold said pin and its projecting portions out of engagement with said teeth.

18. In a clutch: a first member having axially extending teeth thereon projecting axially outward of said member; a second member having a transverse slot therein; a sleeve slidable on said second member; a transverse pin extending through said slot and coupled to said sleeve; said pin being slidable in said slot and having portions projecting transversely beyond said sleeve to be engageable with said teeth; and spring means between said second member and pin yieldably urging said pin and its projecting portions toward meshing engagement with said teeth.

19. In a clutch: a first member having axially extending teeth thereon; a second member movable longitudinally with respect to said first member and having a transverse slot therein; a sleeve slidable longitudinally on said second member; a transverse pin extending through said sleeve and slot and engageable with said teeth; yieldable means engaging said second member and pin to urge said pin toward said first member and toward meshing engagement with said teeth; said second member being movable longitudinally into engagement with said pin to shift said pin out of engagement from said teeth; and detent means engageable with said sleeve to hold said pin out of engagement with said teeth.

References Cited in the file of this patent

UNITED STATES PATENTS

| Number | Name | Date |
|---|---|---|
| 1,110,519 | Wigle | Sept. 15, 1914 |
| 1,379,891 | Aichele | May 31, 1921 |
| 1,635,144 | Stevens | July 5, 1927 |
| 1,725,562 | Borchert | Aug. 20, 1929 |
| 1,954,620 | Connell | Apr. 10, 1934 |
| 2,050,910 | Zancan | Aug. 11, 1936 |
| 2,052,152 | Webb | Aug. 25, 1936 |
| 2,111,280 | Connell | Mar. 15, 1938 |
| 2,259,824 | Lowder | Oct. 21, 1941 |
| 2,476,632 | Shaff | July 19, 1949 |
| 2,484,364 | Whitledge | Oct. 11, 1949 |